Nov. 11, 1930.                C. I. HALL                   1,781,577
SYNCHRONOUS MOTOR DRIVEN PHONOGRAPH
Filed Nov. 28, 1928
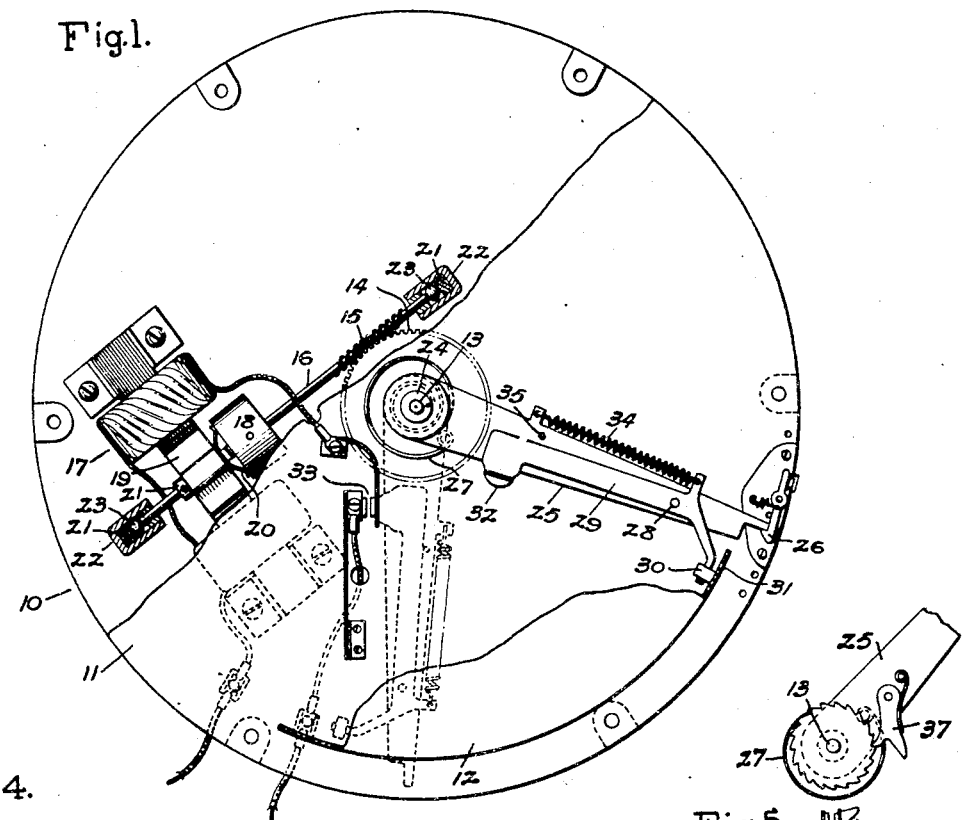
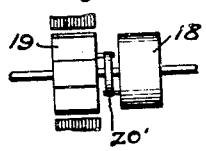
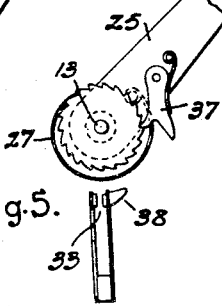
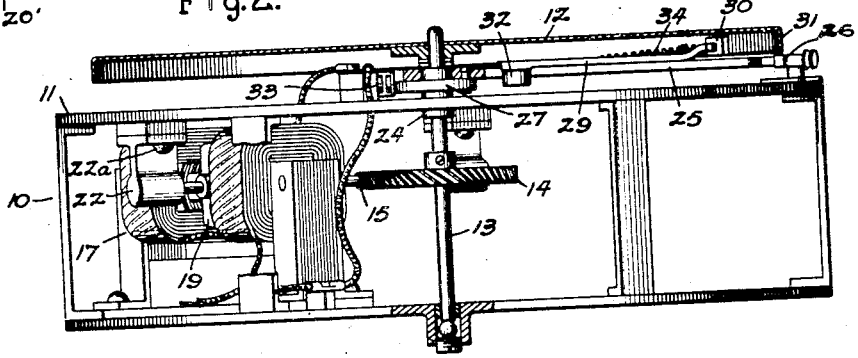
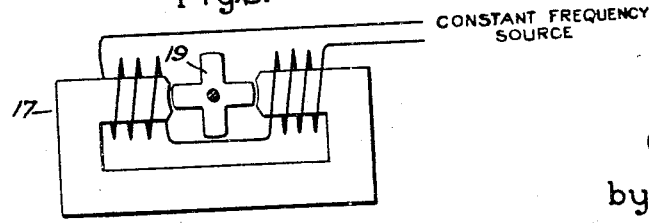
Inventor:
Chester I. Hall,
by Charles V. Mullen
His Attorney.

Patented Nov. 11, 1930

1,781,577

UNITED STATES PATENT OFFICE

CHESTER I. HALL, OF FORT WAYNE, INDIANA, ASSIGNOR TO GENERAL ELECTRIC COMPANY, A CORPORATION OF NEW YORK

SYNCHRONOUS-MOTOR-DRIVEN PHONOGRAPH

Application filed November 28, 1928. Serial No. 322,497.

My invention relates to a synchronous motor drive for phonographs and its primary object is to provide a simple yet reliable electrically driven phonograph which requires no speed governor.

The usual phonograph drive requires some kind of a speed governor controlled brake to maintain the speed of the record turn table at the value required for correct sound reproduction. In spite of various precautions the usual speed governing mechanism tends to produce undesirable noises. This trouble is particularly noticeable in those drives which employ gearing between the driving motor and a rotating part upon which the brake operates due to the variation in power transmitted therethrough under different braking conditions. I have found that the elimination of the governor and brake reduces undesirable noises, simplifies the mechanism and reduces the cost without sacrificing reliability. When a speed governor is employed, slight variations in speed still exist because it requires a change in speed to change the governor and brake setting before any regulation can take place. This slight variation in speed may be and often is greater than the variations in frequency of a well regulated alternating current system. It is therefore feasible to eliminate the governor entirely and drive the phonograph by a synchronous motor.

The power required to drive a phonograph at normal speed without a brake is very small indeed and if we provide other means for bringing the motor and turn table up to the operating speed a very small synchronous motor may be employed. Consequently, I prefer to employ the very simple non-self-starting synchronous motor and provide other means for bringing the rotating parts up to speed. The preferred starting means comprises a spring operated device combined with the motor line switch and a brake for stopping the turn table when the switch is opened.

The features of my invention which are believed to be novel and patentable will be pointed out in the claims appended hereto. For a better understanding of my invention, reference is made to the following description to the accompanying drawing in which Fig. 1 represents a plan view of the synchronous motor drive and starting mechanism with parts broken away to better expose the invention. Fig. 2 shows a side view of the mechanism of Fig. 1 with the turn table in place but shown in section; Fig. 3 illustrates the simplicity of the preferred type of synchronous motor employed to drive the phonograph; Fig. 4 represents a modification of the connection between fly wheel 18 and rotor 19; and Fig. 5 shows an alternative starting arrangement.

Referring to Figs. 1 and 2, 10 represents a supporting framework which will ordinarily be enclosed in a cabinet, not shown. This framework contains and supports the driving mechanism. The phonograph turn table is shown at 12 and is suitably supported in driving relation with and at the top of the drive shaft 13. Shaft 13 carries a gear 14 which meshes with a worm gear 15 on the shaft 16 driven by the synchronous motor 17. The worm gear 15 is cut at such an angle that shaft 16 may be driven from shaft 13 during the starting operation and for this purpose the teeth of worm gear 15 have an angle of pitch exceeding 45 degrees. With a 60 cycle four-pole synchronous motor operating at 1800 R. P. M., the gear ratio between 15 and 14 will be in the neighborhood of 22½ to 1 which will cause the turn table to operate at the normal phonograph record speed in the neighborhood of 80 R. P. M. The pole number of the motor and gear ratio may be changed as desired. Such a motor has a speed which is independent of variations in temperature and in voltage.

Owing to the tendency of a simple synchronous motor to hunt I prefer to provide a frictional connection between shaft 16 and the motor armature and to provide sufficient flywheel effect in the shaft to prevent any possibility of chattering at the gear reduction. To this end a flywheel 18 is secured to shaft 16 but the motor armature 19 is not directly fastened thereto. The armature 19 is provided with spring fingers 20 which are in frictional contact with the adjacent end of the flywheel 18 and this frictional contact is maintained by a collar 21 secured to shaft 16 on the opposite side of the armature. The frictional clutch thus formed provides the necessary driving connection between the motor armature and the shaft 16. However, hunting of the motor armature is not transmitted because of the flywheel effect of 18 and the frictional driving connection. Hunting oscillations, if present, will be absorbed in slight displacements of the parts of the friction clutch. The friction coupling may be replaced by a resilient spiral spring connection between flywheel 18 and rotor 19 as represented at 20′ in Fig. 4.

I prefer also to provide a resilient packing such as felt or cork pads at the two ends of the shaft 16 to eliminate end play noises. Such pads are indicated at 21 between the bearing cup 22 and a steel ball 23 which rests against the end of the shaft. I have found that by adjusting the endwise displacement of the bearing cup 22 to maintain the pads under slight compression, end play noises are entirely eliminated. Such adjustment may be provided for and made between the supporting frame and cup by loosening the fastening screw 22ª shown in Fig. 2.

Where the phonograph is started by hand and where the motor is of the non-self-starting type it may be of a very simple construction as shown in Fig. 3. The rotor may consist simply of solid iron or other magnetic material and have the desired number of salient poles. The stator is likewise of simple construction and does not require shading coils. It is known that such a motor while non-self-starting will operate synchronously when brought up to its synchronous speed. Since the only power required of the motor is to operate the phonograph turn table at normal speed it may be very small and requires little energy. By indicating my preference for a non-self-starting synchronous motor I do not mean to limit my invention thereto. Whether self-starting or non-self-starting it will be apparent that a synchronous motor will drive the phonograph at a constant speed when energized from a constant frequency source and that as a consequence the necessity of a speed governor and brake is eliminated.

If a non-self-starting synchronous motor is used it will be necessary to bring it up to synchronous speed by some other means and this will also be desirable even though a self-starting synchronous motor be used because then the capacity of the motor need not be greater than that required to drive the phonograph at normal speed which is considerably less than that required for starting. One way of bringing the motor up to speed is to simply give the turn table the required spin by hand. However, a more exact and less crude method is desirable and the preferred means for doing this, combined with a motor switch and a turn table stopping brake, will now be described.

The top bearing housing for shaft 13 is indicated at 24. On the upper end of this housing an arm 25 is pivoted. The outer end of this arm extends slightly beyond the turn table and cooperates with a latch 26. A spiral spring 27 has its inner end fastened to the stationary bearing housing and its outer end secured to a pin in the lower side of arm 25. Pivotally mounted at 28 on arm 25 is lever 29. The outer end of this lever is turned up and carries a friction pad 30, which in the position shown contacts with the inner side of a depending flange 31 of the turn table. The inner end of lever 29 carries a turned down part 32 normally spaced slightly away from the lower edge of arm 25 as viewed in Fig. 1. The part 32 is adapted to close the motor switch indicated at 33 when arm 25 is released and allowed to rotate in a clockwise direction as indicated in dotted lines. The switch is preferably resiliently mounted and serves as a resilient stop for the clockwise movement of arm 25. Lever 29 is normally biased to the position shown in full lines with the pad 30 against the inner rim of the turn table by a spring 34. However, when the part 32 strikes against the switch contacts, lever 29 is turned about pivot 28 in a clockwise direction a slight amount until arm 29 comes against a stop such as a stop pin 35. This operation moves pad 30 away from the rim 31 and the tension in spring 27 is made sufficient to hold switch 33 closed and pad 31 away from rim 31.

The position of the parts as shown in full lines is the position when the phonograph is not in use, the motor circuit is open, the turn table is braked at 30, and the spring 27 is under tension. When it is desired to start the phonograph, latch 26 is moved to release lever 25. Arm 25 moves in a clockwise direction, it being driven by spring 27. Pad 30 is in contact with the turn table and the turn table together with all rotating parts of the motor drive are started and accelerated by this movement of arm 25. The tension of spring 27 is sufficient to accelerate the rotatable parts of the drive to approximately the normal operating speed during the movement of arm 35 to the position shown in dotted lines. When the arm reaches the running position, brake pad 30 is quickly moved away from the rim of the turn table and switch 33 closes the motor circuit. The motor readily falls into step and then the turn table is driven by the synchronous motor. To stop the phonograph the lever 25 is simply moved back until it is caught by latch 26. This operation allows the spring switch contacts to open, brakes the turn table and rewinds spring 27 to its original tension. If desired, the position of the catch 26 may be made adjustable about the periphery of the turn table for the purpose of adjusting the accelerating impulse given to rotating parts. The arm 25 and the parts carried thereby are preferably made as light as practicable while the support for switch 33 has sufficient resiliency to stop the arm 25 without shock.

Fig. 5 represents an alternative arrangement for starting the apparatus. The arm 25, the spring 27 and the motor contacts 33 are substantially as represented in Fig. 1. However, instead of a friction contact at the rim of the disc, I have represented a ratchet wheel 36 on the shaft 13 and a pawl lever 37 on arm 25 which is arranged to engage and drive the ratchet wheel 36 when the arm 25 is drawn back and released as explained in connection with Fig. 1. As the parts approach the switch contacts 33 the pawl 37 is thrown outward by the cam shaped finger 38 on the contact. The motor circuit is thus closed and spring 27 holds it closed by pressing arm 25 and pawl 37 towards the switch contacts.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:

1. In a phonograph drive, a shaft, a record turn table mounted on said shaft, a gear on said shaft, a second shaft, a synchronous motor for driving the said second shaft, a worm gear on said second shaft meshing with the first mentioned gear, the pitch of said worm being such that the motor may be started through said gears by rotation of the turn table.

2. In a phonograph drive a turn table shaft provided with a gear, a second shaft carrying a worm meshing with said gear, a flywheel on the second mentioned shaft, a synchronous motor for driving said shaft, and a driving connection permitting relative movement between said synchronous motor and said second shaft, said connection and flywheel serving to prevent hunting pulsations of said synchronous motor from being transmitted through said gears.

3. A phonograph drive comprising a phonograph record turn table, a synchronous motor for driving said turn table, a starting arm for said turn table and motor pivoted on the axis of rotation of said turn table, a spring tending to turn said arm in the normal direction of rotation of said turn table, a normally open switch for said motor positioned to be closed by and to serve as a stop for said arm, and a friction brake for said turn table carried by said arm and arranged to be released from engagement with said turn table by movement of said arm into engagement with said switch.

4. A phonograph motor drive comprising in combination with a record turn table a synchronous motor for driving said turn table, starting means for said turn table comprising an arm pivoted on the axis of rotation of the turn table, a spring for turning said arm in the normal direction of rotation of said table, a catch cooperating with the outer end of said arm and adapted to hold the arm against rotation with the spring under tension, a lever pivoted on said arm and carrying a friction pad adapted to engage in driving relation with a rotatable portion of the phonograph, a switch for said motor having normally open resilient contacts positioned to be engaged and closed by said lever when said arm is released and allowed to rotate under the action of said spring, said contacts serving to release said lever from said driving engagement.

In witness whereof, I have hereunto set my hand this 26th day of November, 1928.

CHESTER I. HALL.